H. NIELSEN AND F. D. MARSHALL.
AIR SATURATING TOWER.
APPLICATION FILED SEPT. 11, 1920.
1,378,717.
Patented May 17, 1921.
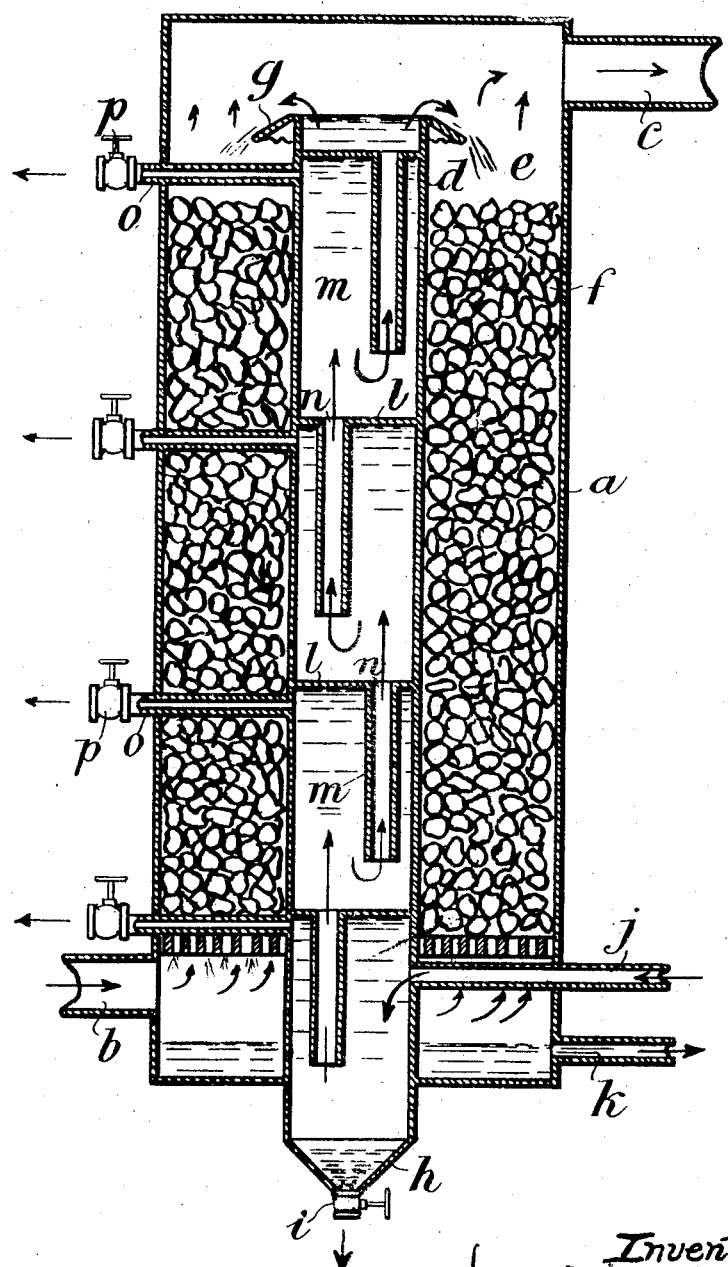

UNITED STATES PATENT OFFICE.

HARALD NIELSEN, OF MIDDLESEX, AND FREDERICK DEACON MARSHALL, OF WESTMINSTER, LONDON, ENGLAND.

AIR-SATURATING TOWER.

1,378,717.  Specification of Letters Patent.  Patented May 17, 1921.

Application filed September 11, 1920. Serial No. 409,667.

*To all whom it may concern:*

Be it known that we, HARALD NIELSEN, a subject of the King of Denmark, and FREDERICK DEACON MARSHALL, subject of the King of Great Britain, residing at, respectively, 13 Firs avenue, Muswell Hill, Middlesex, England, and 19 Queen Anne's Chambers, Westminster, London, England, have invented new and useful Improvements in Air-Saturating Towers, of which the following is a specification.

Our invention relates to an apparatus especially applicable for saturating gas or air with moisture and particularly adapted for use where air or gas is moistened by means of the hot liquid or water from a gas cooling tower or the like containing impurities some of which are heavier than water and some of which are of an oily character and lighter than water.

The use of our invention is not however limited to this particular application but can be used whenever it is desired to saturate air or any gas with the vapors of any impure or dirty volatile liquid.

Apparatus as generally used for the above purposes is either of a mechanical type, that is to say, consists of a tower-like or vertically disposed cylindrical structure provided with either a revolving or a stationary spraying device, or of a tower or cylinder filled with a suitable filling material over which a liquid trickles so as to present a thin film of liquid to the action of the gases or air, generally on the counter-current principle.

We have found that a mechanical device such as indicated above is not suitable in every case, as the liquid surface presented to the action of the gas at any given moment is not very large, and the saturation of the gases is generally an operation requiring a certain time contact and a large liquid surface so that in order to effect complete saturation large and cumbrous apparatus is required and large volumes of liquid must be dealt with per unit of time.

On the other hand the use of a tower containing a filling material, although it satisfies the required conditions as regards a larger liquid surface is not to be recommended, as when employed for hot liquid or water containing tarry matters or other impurities in suspension, the filling material becomes liable to be choked with these impurities, and to separate the suspended matter large settling tanks are required, the use of which causes a drop in temperature and consequent decrease in saturation efficiency of the liquid or water, unless additional heat is supplied, which would increase the cost of operating the apparatus.

Now, our invention has for its object apparatus in which the above described drawbacks are eliminated and to this end it comprises an outer closed tower or cylinder with a gas or air inlet at the bottom and a gas or air outlet at the top and an inner tower or cylinder of smaller diameter than the outside tower and providing a concentric space between it and the outer tower.

The internal tower or cylinder is open at the top and terminates in a liquid or water distributer situated well above the upper surface of the filling material with which the annular space between the two towers or cylinders is packed. At its lower end the said inner cylinder extends through the bottom of the outer cylinder and terminates in a sludge hopper or container, provided with a valve, which may be opened to draw off heavier solid matter which collects at the bottom of cylinder $d$.

The hot water, say from a hot gas cooling tower and containing various impurities in suspension, is pumped direct into the inner cylinder near the bottom thereof, the size or diameter of the said inner cylinder being so calculated that the progress of the hot water upward to the top or distribution point is very slow whereby the settling out of solid matter of heavier specific gravity than that of the liquor or water and the floating upward of the lighter or tarry matters is not interfered with.

The inner cylinder is divided into sections transversely by flat or funnel-shaped bottoms or partitions, which are provided with one or more holes with long depending dip pipes of a suitable diameter. These dip pipes are preferably staggered in each separate section so that each opens above the solid bottom or top of the compartment below. As nearly as is practically convenient beneath each of such partitions an outlet pipe passes through the annular space and the outer cylinder and terminates in a valve for the convenient removal of any lighter or tarry impurities collected on the upper surface of the liquid contained in each compartment.

It will be understood that any lighter matter, during the slow upward movement of the liquid, will thus be trapped in the upper part of each compartment while the heavier matters gradually find their way down to the sludge container or hopper as the dip pipes, in each compartment, depend well down into the liquid and will only allow comparatively clear liquid to pass into the compartment next in order above, the liquid finally reaching the distributer, being clear.

A preferred embodiment of the invention is illustrated in the accompanying drawing which shows in vertical section an air saturating tower constructed according to the invention.

In the said drawing $a$ indicates the closed outer cylinder, $b$ the air (or gas) inlet at the lower end and $c$ the air (or gas) outlet at the upper end thereof. $d$ indicates the inner cylinder or tower of less diameter than the outer tower and $e$ the annular concentric space which is formed between the said inner and outer towers and which space contains the granular filling material $f$.

$g$ is the liquid or water distributer which is fitted to the open upper end of the inner cylinder $d$, $h$ is the sludge hopper which closes the lower end of the said inner cylinder, $i$ the valve with which the said hopper is fitted and $j$ is the inlet pipe by which the water or other liquid enters the lower end of the tube, $k$ is the outlet pipe for the discharge of the liquid which has trickled down through the filling material $f$ in the space $e$.

$l$ indicates the bottoms or partitions here shown flat, although they may be funnel shaped, which divide the inner cylinder $d$ into sections and $m$ indicates the dip tubes, one of which depends from a hole $n$ in each section into that immediately below it. As shown, and as above described, the dip tubes $m$ are staggered in relation to each other so that each tube opens above a solid portion of the partition below it, $o$ indicates the outlet pipe which extends from the top of each section of the inner cylinder $d$ laterally through the space occupied by the filling material $f$ and through the outer cylinder $a$ and $p$ is the valve with which each such tube is fitted.

The device operates as follows. The hot water is pumped through the inlet $j$ into the bottom of the inner cylinder $d$ and passes upward from section to section through the dip pipes $m$ until it reaches the distributer $g$ which spreads it over the upper surface of the filling material $f$ downwardly through which it trickles. In its passage up the inner cylinder $d$ any heavy impurities which it contains settle down in each section and are ultimately collected in the sludge hopper $h$ while the lighter impurities, that is to say, such matter as is lighter than the water, as oily matter, float at the top of each section and are drawn off through the pipes $o$ by opening the valve $p$ with which such pipes are provided. The air to be saturated enters the bottom of the outer tower $a$ at $b$ and passes up through the filling material where it encounters the downwardly trickling water relieved of its impurities and finally leaves the tower in a saturated condition through the outlet $c$ at the top.

It will be understood that there can not be any such loss of heat from the liquids due to outside conditions, as would occur, for instance, when large outside separating or settling tanks are employed, but that substantially all heat stored in the liquid entering the inner tower $d$ is imparted to the filling material $f$ in the annular space $e$, and this heat in turn is available for heating up the air or gas, and saturating the same on its passage through the wetted filling material. Furthermore, the large bulk of hot liquid in the inner tower $d$ acts as a very efficient heat accumulator or equalizer so that the momentary variation in liquor supply will not have any appreciable influence on the temperature of the liquid distributed over the filling $f$ in the annular space $e$, whereby great uniformity and a constant degree of saturation is attained. It will, moreover, be clear that as the liquid distributed over the filling is clean, no choking of the filling material will be occasioned, and that the liquid, as it reaches the bottom of the annular space, $e$, can be pumped back into the hot gas cooler and be thus used again.

Claims:

1. A gas saturating apparatus comprising a closed outer cylinder, having a gas inlet at the bottom and a gas outlet at the top, and a concentric inner cylinder of less diameter providing an annular space, containing filling material, said inner cylinder being closed at its lower end and provided adjacent to its lower end with a liquid inlet, and having its upper end provided with a liquid distributing device discharging within the outer cylinder, into said annular space, upon the filling material therein.

2. A gas saturating apparatus comprising a closed outer cylinder, having a gas inlet at the bottom and a gas-outlet at the top, and a concentric inner cylinder of less diameter providing an annular space, containing filling material, said inner cylinder being closed at its lower end and provided adjacent to its lower end with a liquid inlet, and having its upper end provided with a liquid distributing device discharging within the outer cylinder, into said annular space, upon the filling material therein, said inner cylinder being provided with transverse partitions dividing it into section, each partition being provided with a hole, and a dip tube communicating therewith and depending into the section next below said partition, and laterally extending discharge pipes extending from the upper ends of the several sections thereof through the said annular space and the outer tower, for drawing off lighter impurities.

3. A gas saturating apparatus comprising a closed outer cylinder, having a gas inlet at the bottom and a gas outlet at the top, and a concentric inner cylinder of less diameter providing an annular space, containing filling material, said inner cylinder being closed at its lower end and provided adjacent to its lower end with a liquid inlet, and having its upper end provided with a liquid distributing device discharging within the outer cylinder, into said annular space, upon the filling material therein, said inner cylinder being provided with transverse partitions dividing it into sections, each partition being provided with a hole, and a dip tube communicating therewith and depending into the section next below said partition, and laterally extending discharge pipes extending from the upper ends of the several sections thereof through the said annular space and the outer tower, for drawing off lighter impurities, said inner cylinder being provided with a draw off passage at its lower end discharging outside of the outer cylinder, a valve for normally closing said draw off passage, and valves for closing said latterally extending discharge passages.

HARALD NIELSEN.
FREDERICK DEACON MARSHALL.